US010063671B2

(12) United States Patent
Merchant et al.

(10) Patent No.: US 10,063,671 B2
(45) Date of Patent: Aug. 28, 2018

(54) SYSTEMS AND METHODS FOR PROCESSING PACKETS

(71) Applicant: Gigamon Inc., Santa Clara, CA (US)

(72) Inventors: Shehzad Merchant, Los Altos, CA (US); Qi Ming Ng, Santa Clara, CA (US); Ning Wang, San Jose, CA (US)

(73) Assignee: Gigamon Inc., Santa Clara, CA (US)

( * ) Notice: Subject to any disclaimer, the term of this patent is extended or adjusted under 35 U.S.C. 154(b) by 7 days.

(21) Appl. No.: 15/188,705

(22) Filed: Jun. 21, 2016

(65) Prior Publication Data

US 2016/0301781 A1  Oct. 13, 2016

Related U.S. Application Data

(63) Continuation of application No. 14/157,856, filed on Jan. 17, 2014, now Pat. No. 9,413,859.

(51) Int. Cl.
| | |
|---|---|
| *H04L 12/28* | (2006.01) |
| *H04L 12/56* | (2006.01) |
| *H04L 29/06* | (2006.01) |
| *H04L 12/741* | (2013.01) |
| *H04L 12/721* | (2013.01) |
| *H04L 12/761* | (2013.01) |

(52) U.S. Cl.
CPC .............. *H04L 69/22* (2013.01); *H04L 45/16* (2013.01); *H04L 45/566* (2013.01); *H04L 45/74* (2013.01)

(58) Field of Classification Search
CPC ........ H04L 69/22; H04L 45/586; H04L 45/74
See application file for complete search history.

(56) References Cited

U.S. PATENT DOCUMENTS

| | | | |
|---|---|---|---|
| 7,424,018 B2 | 9/2008 | Gallatin et al. | |
| 7,436,832 B2 | 10/2008 | Gallatin et al. | |
| 7,440,467 B2 | 10/2008 | Gallatin et al. | |
| 7,626,938 B1 * | 12/2009 | Orr | H04L 12/2602 370/251 |
| 7,792,047 B2 | 9/2010 | Gallatin et al. | |

(Continued)

OTHER PUBLICATIONS

Final Office Action dated Feb. 26, 2016 of U.S. Appl. No. 14/157,856 by Merchant, S., et al., filed Jan. 17, 2014.

(Continued)

*Primary Examiner* — Derrick Ferris
*Assistant Examiner* — Farhad Ali
(74) *Attorney, Agent, or Firm* — Perkins Coie LLP

(57) ABSTRACT

A network switch apparatus, includes: a network port configured to receive a packet; instrument ports configured to communicate with respective network monitoring instruments; a packet duplication module configured to copy the packet to provide multiple packets that are identical to each other: a tagging module configured to tag the multiple packets with different respective identifiers to obtain tagged packets; and a processing unit coupled to the instrument ports; wherein the processing unit is configured to determine whether a first one of the tagged packets satisfies a first criterion, whether a second one of the tagged packets satisfies a second criterion, process the first one of the tagged packets in a first manner if the first one of the tagged packets satisfies the first criterion, and process the second one of the tagged packets in a second manner if the second one of the tagged packets satisfies the second criterion.

18 Claims, 10 Drawing Sheets

(56) References Cited

U.S. PATENT DOCUMENTS

| | | |
|---|---|---|
| 8,315,256 B2 | 11/2012 | Leong et al. |
| 2007/0047456 A1 | 3/2007 | Jorgensen et al. |
| 2009/0080338 A1 | 3/2009 | Parker et al. |
| 2010/0161791 A1 | 6/2010 | Duffield et al. |
| 2011/0141894 A1* | 6/2011 | Breslin ................ H04L 67/327 370/235 |
| 2011/0142045 A1* | 6/2011 | Ait-Ameur et al. .... H04L 12/56 370/392 |
| 2013/0054737 A1 | 2/2013 | Miranda et al. |
| 2013/0259037 A1* | 10/2013 | Natarajan ............. H04L 43/026 370/390 |
| 2013/0305272 A1 | 11/2013 | Fullett et al. |
| 2014/0098822 A1 | 4/2014 | Galles et al. |
| 2014/0156646 A1* | 6/2014 | Brust ................ G06F 17/30554 707/722 |
| 2014/0211623 A1* | 7/2014 | Choi ..................... H04L 47/125 370/235 |
| 2015/0101035 A1* | 4/2015 | Subramanian ...... H04L 63/0209 726/11 |

OTHER PUBLICATIONS

Non-Final Office Action dated Aug. 20, of U.S. Appl. No. 14/157,856 by Merchant, S., et al., filed Jan. 17, 2014.
Notice of Allowance dated May 18, 2016 of U.S. Appl. No. 14/157,856 by Merchant, S., et al., filed Jan. 17, 2014.

* cited by examiner

SYSTEMS AND METHODS FOR PROCESSING PACKETS

CROSS-REFERENCE TO RELATED APPLICATIONS

This application is a continuation of the U.S. patent application Ser. No. 14/157,856, filed Jan. 17, 2014, which is incorporated herein in its entirety and by this reference thereto.

FIELD

This application relates generally to network switch apparatus, and more specifically, to systems and methods for processing packets using one or more network switch appliances.

BACKGROUND

Network switch devices may be used to obtain packets from a network, and to forward the packets to one or more network monitoring instruments. Such network switch devices may include a network port for receiving packets from the network, and one or more instrument ports for passing the packets to one or more network monitoring instruments.

An embodiment described herein provides a new network switch apparatus for processing packets for transmission to one or more network monitoring instruments.

SUMMARY

A network switch apparatus, includes: a network port configured to receive a packet; a plurality of instrument ports configured to communicate with respective network monitoring instruments; a packet duplication module configured to copy the packet to provide multiple packets that are identical to each other; a tagging module configured to tag the multiple packets with different respective identifiers to obtain tagged packets; and a processing unit coupled to the plurality of instrument ports; wherein the processing unit is configured to determine whether a first one of the tagged packets satisfies a first criterion, and whether a second one of the tagged packets satisfies a second criterion; and wherein the processing unit is also configured to process the first one of the tagged packets in a first manner if the first one of the tagged packets satisfies the first criterion, and process the second one of the tagged packets in a second manner if the second one of the tagged packets satisfies the second criterion.

Optionally, the processing unit is configured to process the first one of the tagged packets in the first manner by passing at least a portion of the first one of the tagged packets to a first one of the instrument ports, if the first one of the tagged packets satisfies the first criterion.

Optionally, the processing unit is configured to remove the identifier from the first one of the tagged packets to obtain an untagged packet before passing the untagged packet to the first one of the instrument ports.

Optionally, the processing unit is configured to process the second one of the tagged packets in the second manner by passing at least a portion of the second one of the tagged packets to a second one of the instrument ports, if the second one of the tagged packets satisfies the second criterion.

Optionally, the processing unit is configured to remove the identifier from the second one of the tagged packets to obtain an untagged packet before passing the untagged packet to the first one of the instrument ports and/or a second one of the instrument ports.

Optionally, the processing unit is also configured to determine whether the first one of the tagged packets satisfies the second rule if the first one of the tagged packets does not satisfy the first rule.

Optionally, the processing unit is configured to drop the first one of the tagged packets if the first one of the tagged packets does not satisfy the first rule and the second rule.

Optionally, the processing unit is also configured to determine whether the first one of the tagged packets satisfies one or more additional rule(s).

Optionally, the processing unit is also configured to drop the first one of the tagged packets if the first one of the tagged packets does not satisfy the first rule, the second rule, and the one or more additional rule(s).

Optionally, a total number of the multiple packets is equal to a number of rules associated with the network port that includes the first rule and the second rule.

Optionally, a total number of the multiple packets is equal to a number of instrument ports that are associated with the network port.

Optionally, the processing unit is also configured to remove the identifier from the first one of the tagged packets.

Optionally, the packet duplication module comprises a multicast mechanism.

Optionally, the identifiers comprise VLAN tags.

Optionally, the first criterion comprises an identifier and one or more header information, and the first one of the tagged packets is considered as satisfying the first criterion if the identifier and one or more header information of the first one of the tagged packets match the identifier and the one or more header information of the first criterion.

Optionally, the processing unit is configured to process the packet in an out-of-band configuration.

Optionally, the network port and the plurality of instrument ports are parts of a network switch appliance.

Optionally, the packet duplication module is external to the network switch appliance and is in communication with the network switch appliance.

Optionally, the tagging module is external to the network switch appliance and is in communication with the network switch appliance.

Optionally, the packet duplication module and the tagging module are also parts of the network switch appliance.

Optionally, the network switch apparatus further includes an input mechanism for inputting the tagged packets sequentially into the processing unit.

Optionally, the input mechanism comprises one or more loop back ports.

Optionally, the network switch apparatus further includes a set of loopback ports for load balancing the tagged packets across the loopback ports.

Optionally, the processing unit is configured to perform the act of determining whether the first one of the tagged packets satisfies the first criterion, and the act of determining whether the second one of the tagged packets satisfies the second criterion, by comparing the first one and the second one of the tagged packets against a set of criteria in a TCAM, the set of criteria comprising the first criterion and the second criterion.

Optionally, the set of criteria includes the different identifiers for allowing the tagged packets with the different respective identifiers to match thereagainst.

Optionally, the first criterion includes a value that is a same as one of the identifiers tagged to one of the multiple packets.

Optionally, the first and second criteria are configured for allowing different respective ones of the tagged packets that are otherwise identical to each other except for the different respective tagged identifiers to match thereagainst.

A packet processing method performed by a network switch apparatus having a network port and a plurality of instrument ports, includes: receiving a packet at the network port of the network switch apparatus; copying the packet to provide multiple packets that are identical to each other; tagging the multiple packets with different respective identifiers to obtain tagged packets; determining whether a first one of the tagged packets satisfies a first criterion; determining whether a second one of the tagged packets satisfies a second criterion, wherein the acts of determining are performed using a processing unit; processing the first one of the tagged packets in a first manner if the first one of the tagged packets satisfies the first criterion; and processing the second one of the tagged packets in a second manner if the second one of the tagged packets satisfies the second criterion.

Optionally, the act of processing the first one of the tagged packets in the first manner comprises passing at least a portion of the first one of the tagged packets to a first one of the instrument ports, if the first one of the tagged packets satisfies the first criterion.

Optionally, the act of processing the first one of the tagged packets in the first manner further comprises removing the identifier from the first one of the tagged packets to obtain an untagged packet before passing the untagged packet to the first one of the instrument ports.

Optionally, the act of processing the second one of the tagged packets in the second manner comprises passing at least a portion of the second one of the tagged packets to a second one of the instrument ports, if the second one of the tagged packets satisfies the second criterion.

Optionally, the method further includes determining whether the first one of the tagged packets satisfies the second rule if the first one of the tagged packets does not satisfy the first rule.

Optionally, the method further includes dropping the first one of the tagged packets if the first one of the tagged packets does not satisfy the first rule and the second rule.

Optionally, the method further includes determining whether the first one of the tagged packets satisfies one or more additional rule(s).

Optionally, the method further includes dropping the first one of the tagged packets if the first one of the tagged packets does not satisfy the first rule, the second rule, and the one or more additional rule(s).

Optionally, a total number of the multiple packets is equal to a number of rules associated with the network port that includes the first rule and the second rule.

Optionally, a total number of the multiple packets is equal to a number of instrument ports that are associated with the network port.

Optionally, the method further includes removing the identifier from the first one of the tagged packets.

Optionally, the act of copying is performed using a multicast mechanism.

Optionally, the identifiers comprise VLAN tags.

Optionally, the first criterion comprises an identifier and one or more header information, and the first one of the tagged packets is considered as satisfying the first criterion if the identifier and one or more header information of the first one of the tagged packets match the identifier and the one or more header information of the first criterion.

Optionally, the packet is processed in an out-of-band configuration.

Optionally, the network switch apparatus comprises a network switch appliance having the network port and the plurality of instrument ports, and wherein the act of receiving is performed by the network switch appliance.

Optionally, the act of copying is performed by a packet duplication module that is external to the network switch appliance and is in communication with the network switch appliance.

Optionally, the act of tagging is performed by a tagging module is external to the network switch appliance and is in communication with the network switch appliance.

Optionally, the act of copying and the act of tagging are performed by the network switch appliance.

Optionally, the method further includes inputting the tagged packets sequentially into the processing unit.

Optionally, the act of inputting is performed using one or more loop back ports.

Optionally, the method further includes passing the tagged packets through a set of loopback ports for load balancing the tagged packets across the loopback ports.

Optionally, the act of determining whether the first one of the tagged packets satisfies the first criterion, and the act of determining whether the second one of the tagged packets satisfies the second criterion, are performed by comparing the first one and the second one of the tagged packets against a set of criteria in a TCAM, the set of criteria comprising the first criterion and the second criterion.

Optionally, the set of criteria includes the different identifiers for allowing the tagged packets with the different respective identifiers to match thereagainst.

Optionally, the first criterion includes a value that is a same as one of the identifiers tagged to one of the multiple packets.

Optionally, the first and second criteria are configured for allowing different respective ones of the tagged packets that are otherwise identical to each other except for the different respective tagged identifiers to match thereagainst.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DESCRIPTION OF THE EMBODIMENTS

Figure 1A:
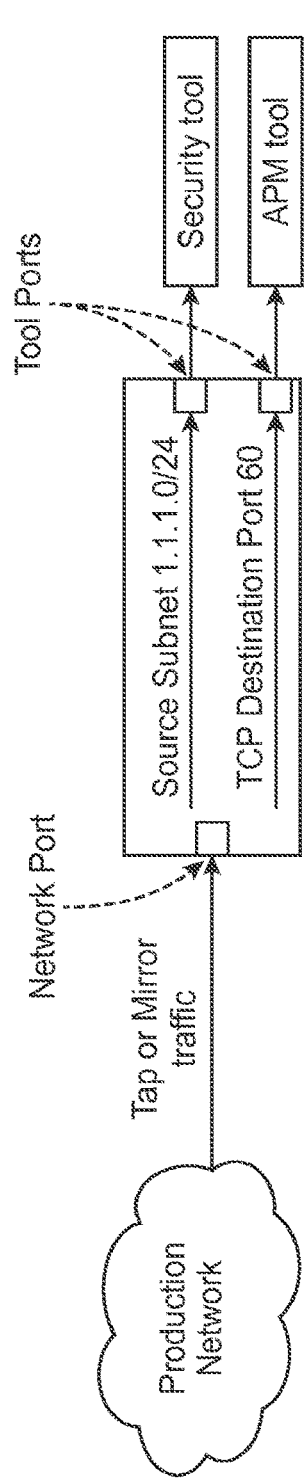
FIG. 1A illustrates an example of a packet switch apparatus passing packets satisfying different rules to different respective network monitoring instruments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated.

Many information technology (IT) organizations have multiple groups or departments. Each group or department may use its own network monitoring instruments for monitoring and managing different aspects of IT. Many of these network monitoring instruments require access to network traffic flowing over the network in order to perform their analysis. The traffic streams and data that the network monitoring instruments require access to vary based on the type of the instrument, what aspects of IT they are monitoring, etc. As a consequence, multiple of these network monitoring instruments may require access to network traffic that may be common across the network monitoring instruments, and in some cases may be unique across the network monitoring instruments. A network switch apparatus may be used to deliver traffic from the production network to the network monitoring instruments. What is important is that the traffic delivered by the network switch apparatus to one network monitoring instrument should not impact, influence, or affect the traffic being sent to another network monitoring instrument.

Figure 1B:
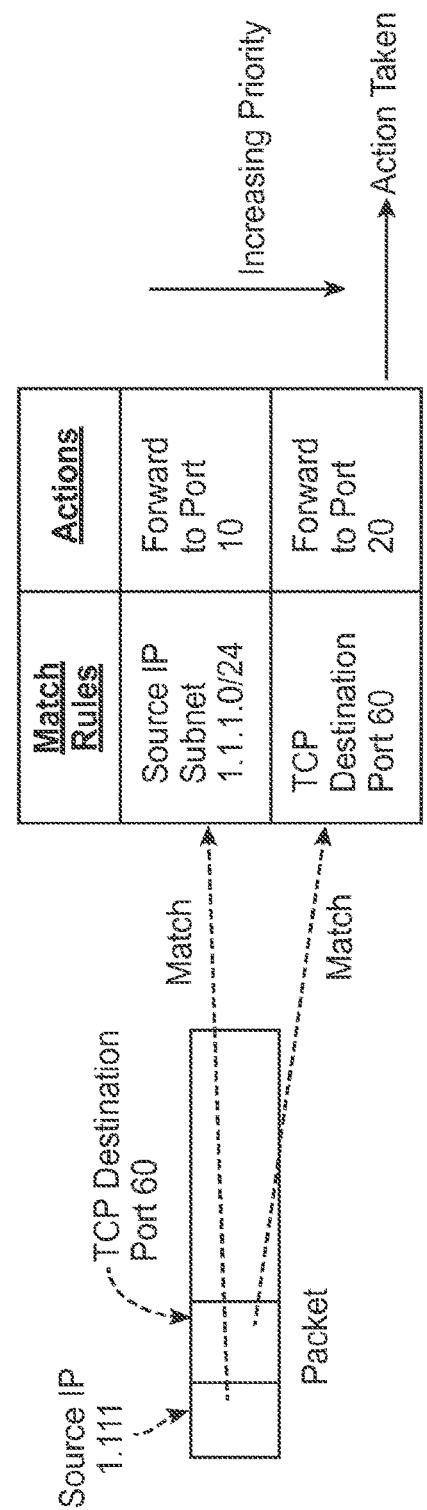
FIG. 1B illustrates an example of a packet matching with multiple rules, but only one action is taken based on only one of the matched rules.

FIG. 1B illustrates an example of a packet matching with multiple rules, but only one action is taken based on only one of the matched rules;

For example, as shown in FIG. 1A, if a security tool needs all traffic from source subnet 1.1.1.0/24, and an application performance management tool (APM) needs all traffic associated with TCP destination port 60, the administrator or owners of these tools (network monitoring instruments) should be able to specify the rules/policies for forwarding this traffic to the tools independently. In particular, the security administrator should be able to specify that all traffic from source subnet 1.1.1.0/24 should go to the security instrument. The application administrator should be able to independently specify that all traffic with TCP destination port 60 should go to the APM instrument.

However if a packet comes in that has source IP 1.1.1.0/24 and destined for TCP port 60, then that packet needs to go to both the security instrument and the APM instrument, since it matches the independently specified criteria for forwarding traffic to both of those network monitoring instruments. This situation may be referred to as "overlapping rules" since the traffic overlaps multiple rules in terms of the match criteria. As a result of the overlapping rules, the network switch apparatus should take multiple actions that correspond to the overlapping rules so that the same packet will be passed to both the security instrument and the APM instrument.

The overlapping rules situation poses a significant challenge for implementation of the network switch apparatus. This is because some switching chipsets providers implement tables (that can be internal to the chip or can reside externally) for specifying matching criteria, and corresponding actions. If a packet matches a criteria in an entry of the table, the device implementing the switching chipset will then perform the action(s) to process the packet that corresponds with the matched criteria in the entry. In some cases, these tables may be set up so that if multiple specified rules match a packet, only the action(s) associated with a single rule is executed. This may be done for example using a priority based scheme based on the order of entries within the table or some other mechanism to determine priority. The highest priority matching entry is the one whose action(s) get selected. In some cases, these tables may be partitioned into slices. In this implementation, if there are multiple matches across slices, a mechanism may be provided to serve as a tie breaker, and to select only one entry whose action(s) gets selected. In either case, even though multiple entries may match the traffic criteria, only one action is selected for processing the packet. An example of this scenario is explained below.

As shown in FIG. 1B, for example, the security department has put in an entry to match anything from IP subnet 1.1.1.0/24 and the action is to send that traffic to the security instrument (which for example may be coupled to port 10), and the applications team has specified an entry that matches TCP destination port 60 and the action is to send traffic that matches TCP destination port 60 to the APM instrument (which for example is coupled to port 20), then if a packet comes in from source IP 1.1.1.1 and TCP destination port 60, only one action will be taken based on a certain priority resolution logic. As a result, one of the security department and the applications department (depending on the priority resolution logic) may not receive the packet. Worse still, if the applications department has entered its entry subsequent to the security team configuring its entry, and has entered its entry at a higher priority, then traffic will be passed to the APM instrument, and not to the security instrument. As a result, the APM instrument will have usurped the traffic that the security instrument should be getting.

Figure 2:
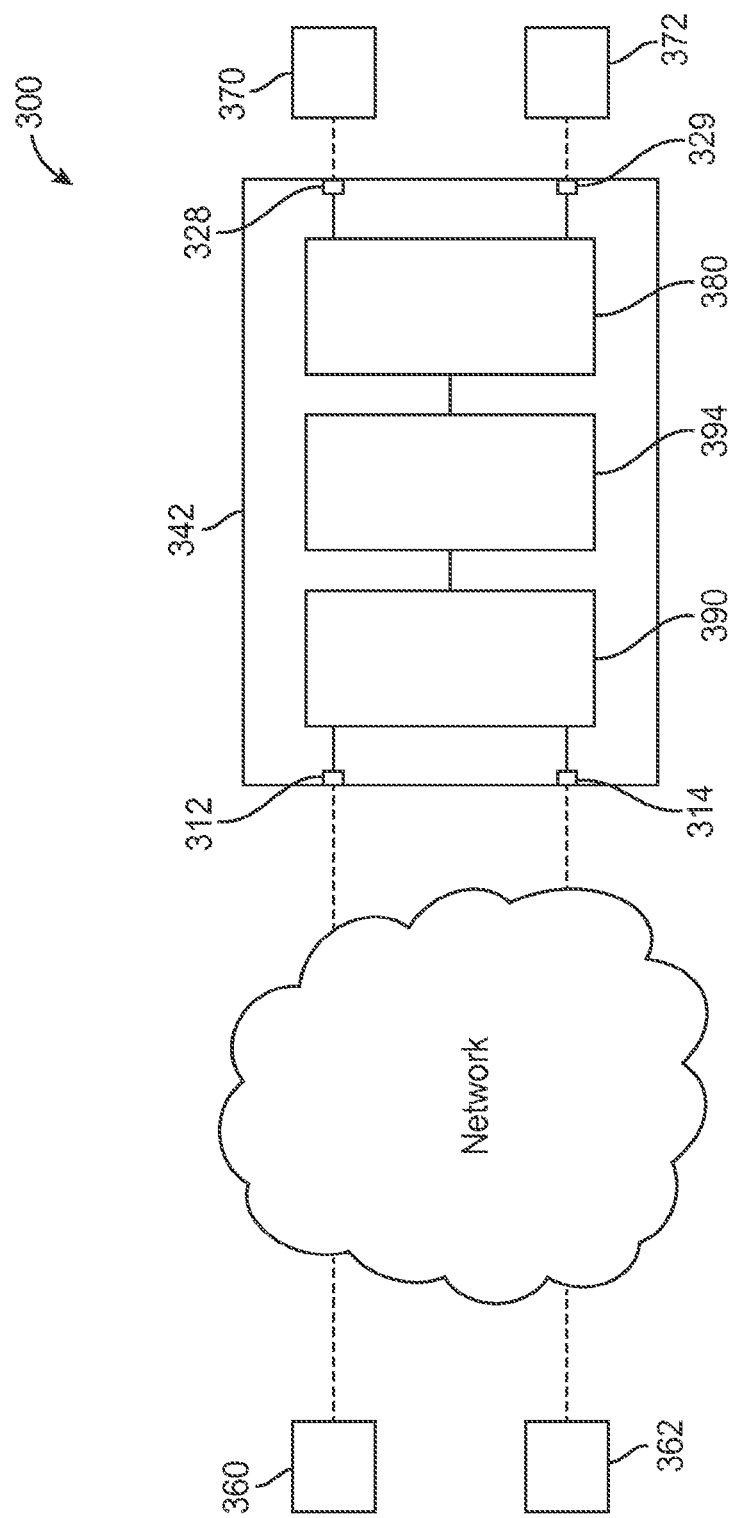
FIG. 2 illustrates a packet switch apparatus.

FIG. 2 illustrates a network switch apparatus 300 in accordance with some embodiments. The network switch apparatus 300 is in a form of a network switch appliance (device), and includes a first network port 312, a second network port 314, a first instrument port 328, and a second instrument port 329. The network switch appliance 300 also includes a processing unit 380, and a network switch housing 342 for containing the processing unit 380. In the illustrated embodiments, the device 300 also includes other components, such as a Network PHY (not shown) coupled to each of the respective ports 312, 314, wherein the Network PHYs may be considered to be parts of the processing unit 380. Alternatively, the Network PHYs may be considered to be components that are separate from the processing unit 380. The PHY is configured to connect a link layer device to a physical medium such as an optical fiber, copper cable, etc. In other embodiments, instead of the PHY, the device 300 may include an optical transceiver, or a SERDES, etc. The housing 342 allows the device 300 to be carried, transported, sold, and/or operated as a single unit. The ports 312, 314, 328, 329 are located at a periphery of the housing 342. In other embodiments, the ports 312, 314, 328, 329 may be located at other locations relative to the housing 342. Although two network ports 312, 314 are shown, in other embodiments, the device 300 may include more than two network ports. Also, although two instrument ports 328, 329 are shown, in other embodiments, the device 300 may include only one instrument port, or more than two instrument ports.

During use, the first network port 312 of the device 300 is communicatively coupled to a first node 360, and the second port 314 is communicatively coupled to a second node 362. The network switch appliance 300 is configured to receive packets from the first and second nodes 360, 362 via the network ports 312, 314. Also, during use, the instrument ports 328, 329 of the device 300 are communicatively coupled to respective instruments 370, 372. The instruments 370, 372 may be directly coupled to the network switch appliance 300, or communicatively coupled to the network switch appliance 300 through the network (e.g., Internet). In some cases, the network switch appliance 300 is provided as a single unit that allows the appliance 300 to be deployed at a single point along a communication path. In the illustrated embodiments, the processing unit 380 is configured to receive packets from nodes 360, 362 via the network ports 312, 314, and process the packets in accordance with a predefined scheme. For example, the processing unit 380 may pass packets received from one or more nodes to one or more instruments that are connected to respective instrument port(s) 328, 329.

In one or more embodiments, the processing unit 380 is configured to operate as a switch module or packet switch that provides packet transmission in accordance with a pre-determined transmission scheme. In some embodiments, the packet switch may be user-configurable such that packets may be transmitted in a one-to-one configuration (i.e., from one network port to an instrument port). As used in this specification, the term "instrument port" refers to any port that is configured to transmit packets to an instrument, wherein the instrument may be a non-pass through device (i.e., it can only receive packets intended to be communicated between two nodes, and cannot transmit such packets downstream), such as a sniffer, a network monitoring system, an application monitoring system, an intrusion detection system, a forensic storage system, an application security system, etc., or the instrument may be a pass-through device (i.e., it can receive packets, and transmit the packets back to the appliance 300 after the packets have been processed), such as an intrusion prevention system. In other embodiments, the packet switch may be configured such that the packets may be transmitted in a one-to-many configuration (i.e., from one network port to multiple instrument ports). In other embodiments, the packet switch may be configured such that the packets may be transmitted in a many-to-many configuration (i.e., from multiple network ports to multiple instrument ports). In further embodiments, the packet switch may be configured such that the packets may be transmitted in a many-to-one configuration (i.e., from multiple network ports to one instrument port). In some embodiments, the one-to-one, one-to-many, many-to-many, and many-to-one configurations are all available for allowing a user to selectively configure the network switch appliance 300 so that the packets (or certain types of packets) are routed according to any one of these configurations. In some embodiments, the packet movement configuration is predetermined such that when the packet switch appliance 300 receives the packets, the packet switch appliance 300 will automatically forward the packets to the ports based on the predetermined packet movement configuration (e.g., one-to-one, one-to-many, many-to-many, and many-to-one) without the need to analyze the packets (e.g., without to-one) without the need to examine the header, determine the type of packets, etc.).

Examples of packet switch that may be used to implement features described herein include any of the commercially available network switch devices, such as GigaVUE™, that is available at Gigamon, Inc. Other examples of packet switch that may be used to implement features described herein are described in U.S. patent application Ser. Nos. 12/148,481, 12/255,561, 11/123,273, 11/123,465, and 11/123,377, the entire disclosure of all of which is expressly incorporated by reference herein.

In accordance with some embodiments, the packet switch implemented using the processing unit 380 may have the functionalities of a conventional packet switch except that it provides visibility into various parts of a network. Thus, embodiments of the packet switch may operate like a conventional managed packet switch, but providing packet monitoring function. This is accomplished by configuring the packet switch to operate as a circuit switch under certain circumstances. In some embodiments, the configuring of the managed packet switch may be performed by utilizing a CPU interface of the switch to modify appropriate registers in the switch to allow for the desired operation.

It should be noted that the packet switch that may be used with the device 300 is not limited to the examples described above, and that other packet switches with different configurations may be used as well. Also, in any of the embodiments described herein, the processing unit implementing the packet switch may be any integrated circuit, such as a processor (e.g., a general purpose processor, a network processor, an ASIC processor, a FPGA processor, etc.). In some embodiments, the processing unit 380 may be processor, such as a field processor. In other embodiments, the processing unit 380 may be a network card. Also, in some embodiments, the processing unit 380 may include ternary content-addressable memory (TCAM). By means of non-limiting examples, the processing unit 380 may be a type StrataXGS family device, manufactured by Broadcom, at Irvine, Calif. The processing unit 380 may be configured to perform various packet processing functions, included but not limited to packet filtering, packet routing, packet switching, packet mirroring, packet aggregation, etc.

As shown in FIG. 2, the network switch appliance 300 also includes a packet duplication module 390 configured to copy a packet received from a network port (e.g., network port 312 or network port 314) to provide multiple packets that are identical to each other. In some embodiments, the packet duplication module 390 may be implemented using a multicast mechanism. In other embodiments, the packet duplication module 390 may be implemented using other mechanisms that are capable of generating multiple copies of a packet. The network switch appliance 300 also includes a tagging module 394 configured to tag the multiple packets with different respective identifiers to obtain tagged packets. In some embodiments, the identifiers may be different respective VLAN tags. In other embodiments, the identifiers may be other types of identifiers.

During use the network ports 312, 314 receive packets from the network, and pass the packets to the packet duplication module 390. The packet duplication module 390 provides multiple copies of the packets based at least in part on the network port (e.g., port 312, port 314) from which the packets are received. For example, the packet switch appliance 300 may prescribe that a packet received from network port 312 be processed to provide two duplicate packets, while a packet received from network port 314 may be processed to provide six duplicate packets. The packet duplication module 390 passes the duplicate packets to the tagging module 394, which is configured to tag the multiple duplicate packets with different respective identifiers so that packets that are otherwise identical to each other may be distinguished from each other. The tagging module 394 then passes the tagged duplicate packets to the processing unit 380 for processing.

In some embodiments, the processing unit 380 has access to a set of matching rules with corresponding prescribed actions. For example, the processing unit 380 may include a non-transitory medium storing the matching rules and corresponding prescribed actions. Alternatively, the processing unit 380 may be configured to communicate with a non-transitory medium storing the matching rules and corresponding prescribed actions. The non-transitory medium may be internal to the network switch appliance 300 or external to the network switch appliance 300. After the processing unit 380 receives the multiple tagged packets (that are identical to each other except for the tagged identifiers), the processing unit 380 then compares the multiple tagged packets with the matching rules to determine if there are one or more matches. For each of the matched packets that matches a rule, the processing unit 380 then executes the prescribed action that corresponds with the matched rule. By means of non-limiting examples, a prescribed action may be to forward the packet to an instrument port, to forward the packet to multiple instrument ports, to drop the packet, etc.

In some embodiments, the rules and the corresponding actions may be implemented using table(s) that may either be stored in a chip set, or may be external to the chip set. The chip set may be a component in the network switch apparatus. In some embodiments, the chip set may be the processing unit 380, or a part of the processing unit 380.

Each of the matching rule may have one or more criteria, including but not limited to, ingress port identifier (network port identifier), source and/or destination MAC address, source and/or destination IP address, protocol, TCP source, UDP source, and destination port (instrument port), etc., or any combination of the foregoing. Also, the corresponding action for each of the matching rule may be any action, such as for example, forwarding the packet to a specific port (e.g., instrument port), forwarding the packet to a group of ports (e.g., instrument ports), dropping the packet, assigning the packet to multicast group, modifying certain field(s) in the packet, etc.

Figure 3A:
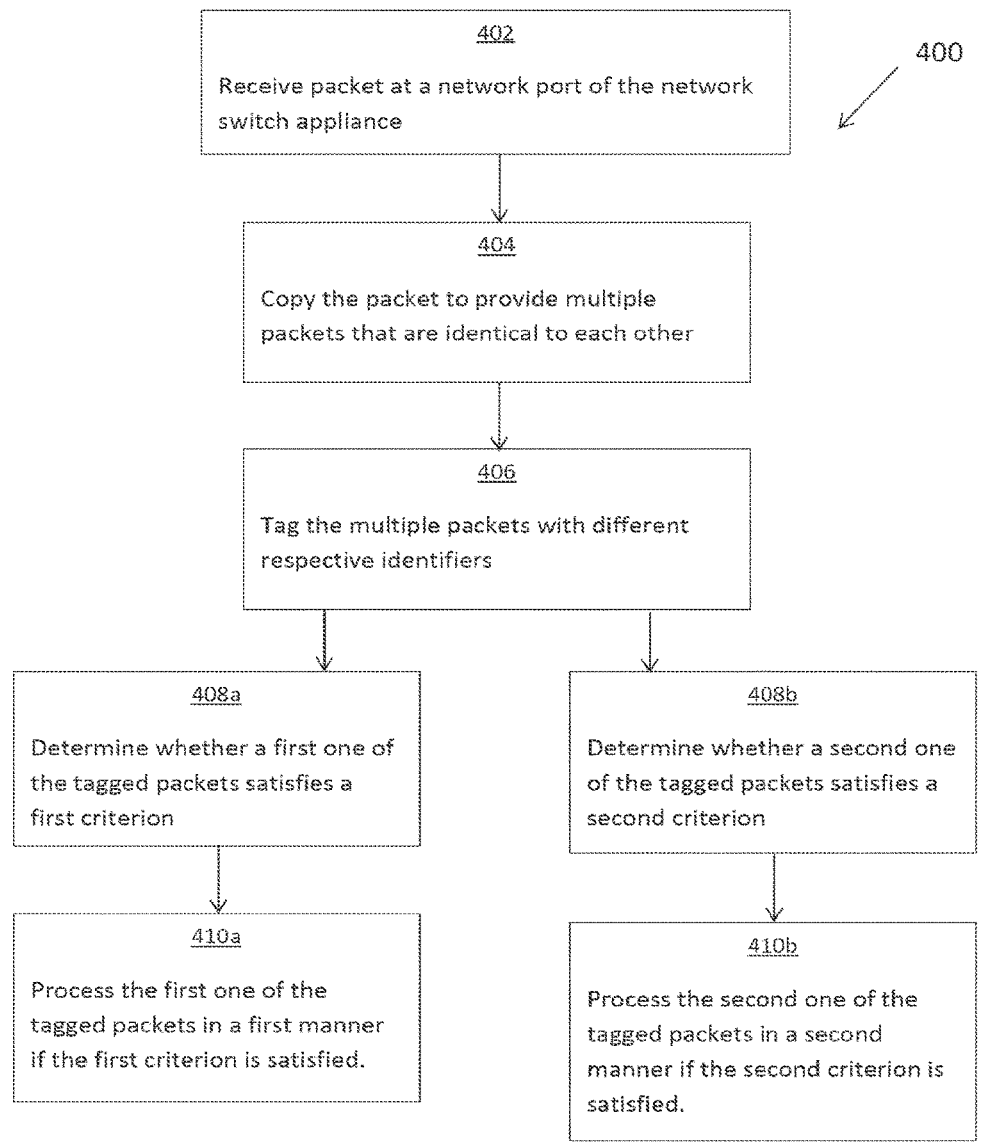
FIGS. 3A and 3B illustrate a method performed by the packet switch apparatus of FIG. 2.
Figure 3B:
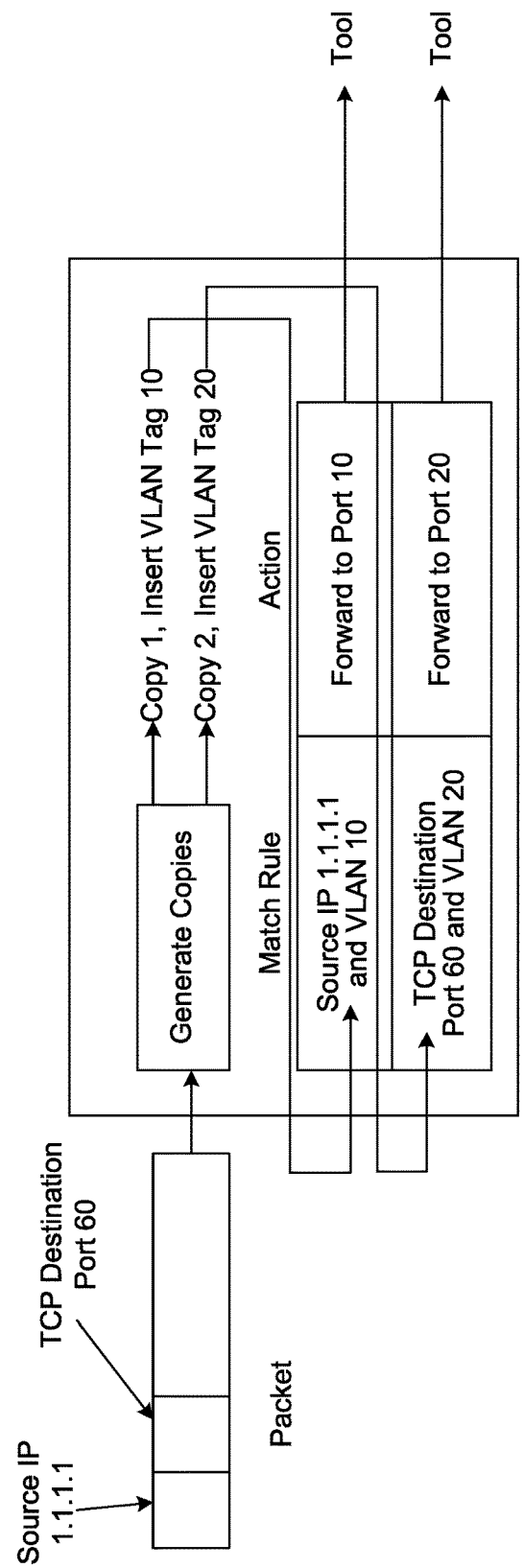

FIGS. 3A and 3B illustrate a method 400 of packet processing in accordance with some embodiments. First, a packet is received at a network port of the network switch appliance 300 (Item 402). In some embodiments, the act of receiving the packet comprises tapping the packet from a network. The received packet may have a header that includes information regarding the packet, and a body of the packet. For example, the received packet may have a source IP address (e.g., Source IP 1.1.1.1) and a TCP destination port identifier (e.g., TCP Destination port 60) in its header.

After the packet is received at the network switch appliance 300, the packet duplication module 390 then copies the packet to provide multiple packets that are identical to each other (Item 404). Following the above examples, the packet duplication module 390 will provide multiple packets that are identical to the original packet received from the network port, such that each of the multiple packets will have Source IP 1.1.1.1 and TCP destination port 60 in its header, and the body of each of the multiple packets will be identical to the body of the originally received packet. In other embodiments, the multiple duplicate packets may not include all of the information from the originally received packet. For example, in other embodiments, only some of all the header information may be duplicated. Also, in other embodiments, the multiple duplicate packets may not include the body of the original packet. In some embodiments, the packet duplication module 390 may be implemented using a multicast mechanism, and the act of copying the packet is performed using the multicast mechanism. In other embodiments, the generation of the multiple packets that are identical to each other may be performed using other mechanisms.

In the illustrated embodiments, the number of packets that are identical to each other provided by the packet duplication module 390 may be equal to a number of instrument ports that are associated with the network port receiving the packet. For example, if based on certain packet filtering rule(s), there are two possible instrument ports that may receive packets from a certain network port, then in such example, the packet duplication module 390 may provide two packets that are identical to each other. As another example, if based on certain packet filtering rule(s), there are six possible instrument ports that may receive packets from a certain network port, then in such example, the packet duplication module 390 may provide six packets that are identical to each other.

In other embodiments, the number of packets that are identical to each other may be equal to a number of packet filtering rules that are associated with a certain network port. For example, if there are a total of two filtering rules for processing packets received from a certain network port, then the number of duplicate packets provided by the packet duplication module 390 will be two.

As shown in the method 400 of FIG. 3A, next, the multiple packets are tagged by the tagging module 394 with different respective identifiers to obtain tagged packets (Item 406). In the illustrated example, the first one of the duplicate packets is tagged with identifier "10", and the second one of the duplicate packets is tagged with identifier "20". Thus, all the tagged duplicate packets are identical except that they will have different respective identifiers. In some embodiments, the identifiers may be VLAN tags. In other embodiments, the identifiers may be other types of identifiers.

Next, the processing unit determines whether a first one of the tagged packets satisfies a first criterion (Item 408a), and processes the first one of the tagged packets in a first manner if the first one of the tagged packets satisfies the first criterion (Item 410a). The processing unit also determines whether a second one of the tagged packets satisfies a second criterion (Item 408b), and processes the second one of the tagged packets in a second manner if the second one of the tagged packets satisfies the second criterion (Item 410b). FIG. 3B illustrates an example of Items 408, 410 using the above example of the packet. As shown in FIG. 3B, a first one of the tagged duplicate packets has source IP address 1.1.1.1, TCP Destination port 60, and VLAN tag 10. This packet matches one of the matching rules that has "1.1.1.1" as the source IP address, and "10" as the VLAN tag identifier. Accordingly, the processing unit 380 forwards that packet to instrument port "10" according to the prescribed action associated with the matched rule. Similarly, a second one of the tagged duplicate packets has source IP address 1.1.1.1, TCP Destination port 60, and VLAN tag 20. This packet matches a different one of the matching rules that has "60" as the TCP Destination port identifier, and "20" as the VLAN tag identifier. Accordingly, the processing unit 380 forwards that packet to instrument port "20" according to the prescribed action associated with the matched rule.

In some embodiments, the component used to compare the tagged duplicate packets against the parameters in the matching rules is implemented using a processor that has a TCAM. For example, the processing unit 380 may include a TCAM. A TCAM processor is configured to process the packets one at a time, compare each packet against the matching rules sequentially and select only one of the prescribed actions in response to a matched packet. In such cases, the network switch appliance 300 may further include a mechanism for inputting the tagged packets into the TCAM processor. In one implementation, a loop-back port may be used. For example, the multiple tagged packets may be forwarded to a loop-back port, which transmits the tagged packets sequentially for input to the TCAM processor. Such configuration is illustrated in FIG. 2B, showing the packets looped back externally. In other embodiments, the loop back may be achieved internally. Following the above example, the first tagged packet (e.g., the packet with source IP 1.1.1.1, TCP Destination port 60, and tagged identifier "10") is first input into the TCAM processor, the TCAM processor then compares the relevant header information in such packet and the tagged identifier against those in the rules. The TCAM processor goes down the set of rules, one at a time, until a match is found. For example, if the header information and the tagged identifier of the packet does not match the first rule in the order, then the packet is compared against the next rule in the order, etc. If a match is found, the TCAM processor then selects the corresponding prescribed action for processing the packet. On the other hand, if a match is not found after going through all of the rules, the tagged packet may then be dropped by the TCAM processor. After the first tagged packet has been compared with all of the rules, the TCAM receives the second tagged packet from the loop back. Following the above example, the second packet has source IP 1.1.1.1, TCP Destination port 60, and tagged identifier "0". The TCAM processor then compares the relevant header information in such packet and the tagged identifier against those in the rules. The TCAM processor goes down the set of rules again, one at a time, until a match is found. For example, if the header information and the tagged identifier of the second tagged packet does not match the first rule in the order, then the second tagged packet is compared against the next rule in the order, etc. If a match is found, the TCAM processor then selects the corresponding prescribed action for processing the packet. On the other hand, if a match is not found after going through all of the rules, the tagged packet may then be dropped by the TCAM processor.

It should be noted that the terms "first", "second", etc., (as in "first one of the tagged packets", "second one of the tagged packets", etc.) are used to identify respective items, and so these terms are not intended to describe the order of the items. Thus, "first one of the tagged packets" may refer to any of the tagged packets, and may or may not be the first one of the tagged packets in the order. Same is true for "second one of the tagged packets"—i.e., it may or may not be the second one of the tagged packets in the order.

In the above example, the prescribed action associated with each of the rules identifies an instrument port for forwarding the packet. In other examples, one or more of the prescribed actions may identify multiple instrument ports for forwarding a packet. Also, in other embodiments, the number of rules may be more than two.

In some embodiments, the identifier (the VLAN tag identifier) added by the tagging module 394 may be removed before the packet is forwarded to the instrument port(s). Such may be accomplished by the processing unit. In other embodiments, the removing of the identifiers may be performed using a tag stripping module, which may be a part of the network switch appliance 300, or may be external to the network switch appliance 300.

As shown in the above embodiments, the network switch appliance 300 is advantageous because it can identify a packet that satisfies multiple matching rules, thereby allowing the same packet to be forwarded to different sets of instrument port(s) based on the matched corresponding rules.

As shown in the above example, the packet switch appliance 300 processes the packet received at the network port in an out-of band configuration because after the packet is tapped from the network and is received by the packet switch appliance 300, the packet is forwarded to one or more instrument ports for receipt by one or more network monitoring instruments, and the packet is not transmitted back to the network from which it was tapped. Thus, the packet switch appliance 300 does not participate in the packet transmission to transmit packet to its original intended recipient. Instead, a packet may have a first destination address (original intended recipient), and the packet switch appliance 300 transmits the packets to a second destination address that is different from that of the original intended recipient.

In the above embodiments, the network switch appliance 300 includes the network port, the plurality of instrument ports, the packet duplication module 390, and the tagging module 394. In such cases, the network switch appliance 300 itself may be considered as a network switch apparatus. In other embodiments, one or more of these components may be external to the network switch appliance 300.

Figure 4A:
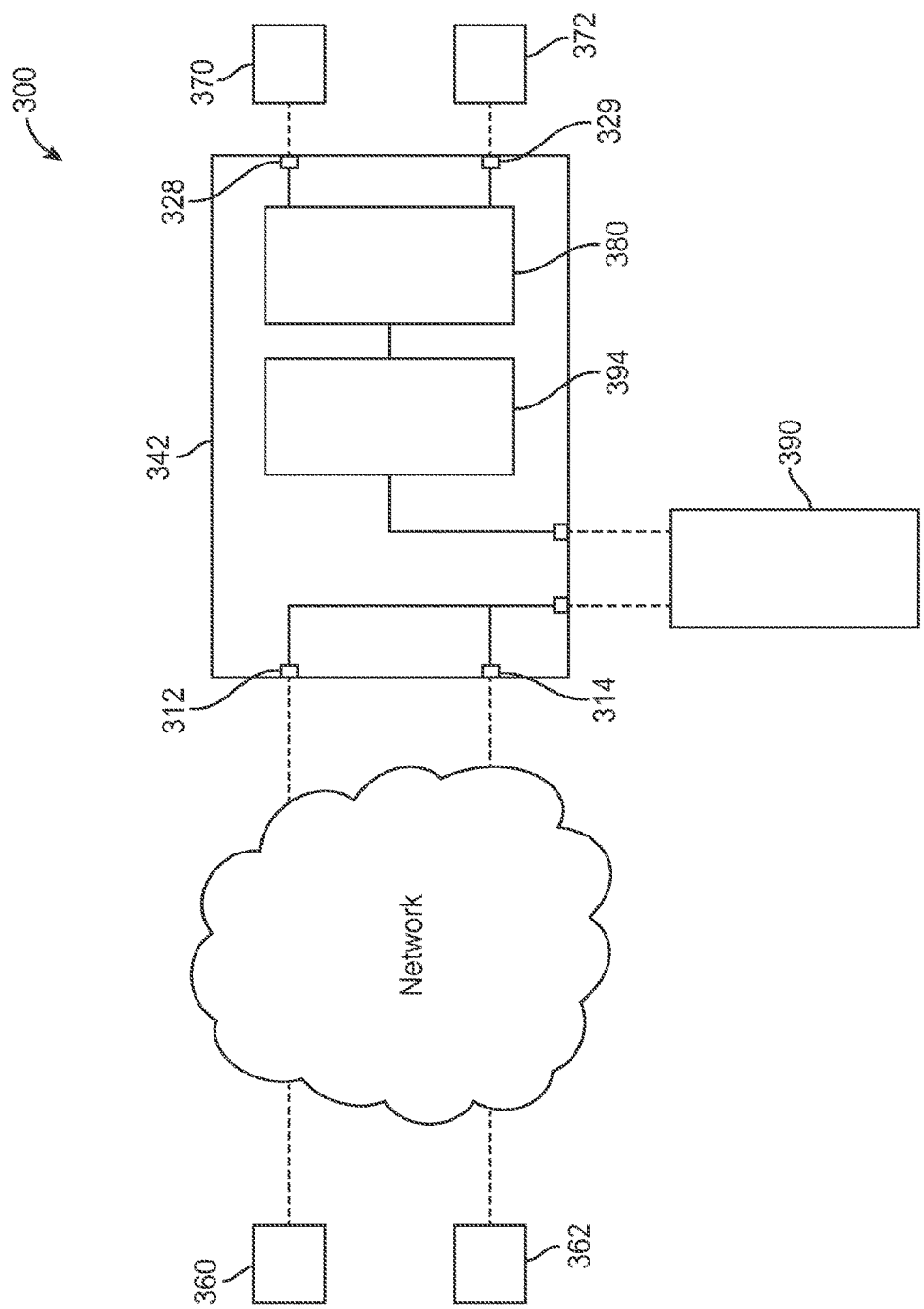
FIG. 4A illustrates a variation of the packet switch apparatus of FIG. 1.

For example, as shown in FIG. 4A, in other embodiments, the packet duplication module 390 is external to the network switch appliance 300 and is in communication with the network switch appliance 300. In such cases, the network switch appliance 300 and the packet duplication module 390 collectively form a network switch apparatus.

Figure 4B:
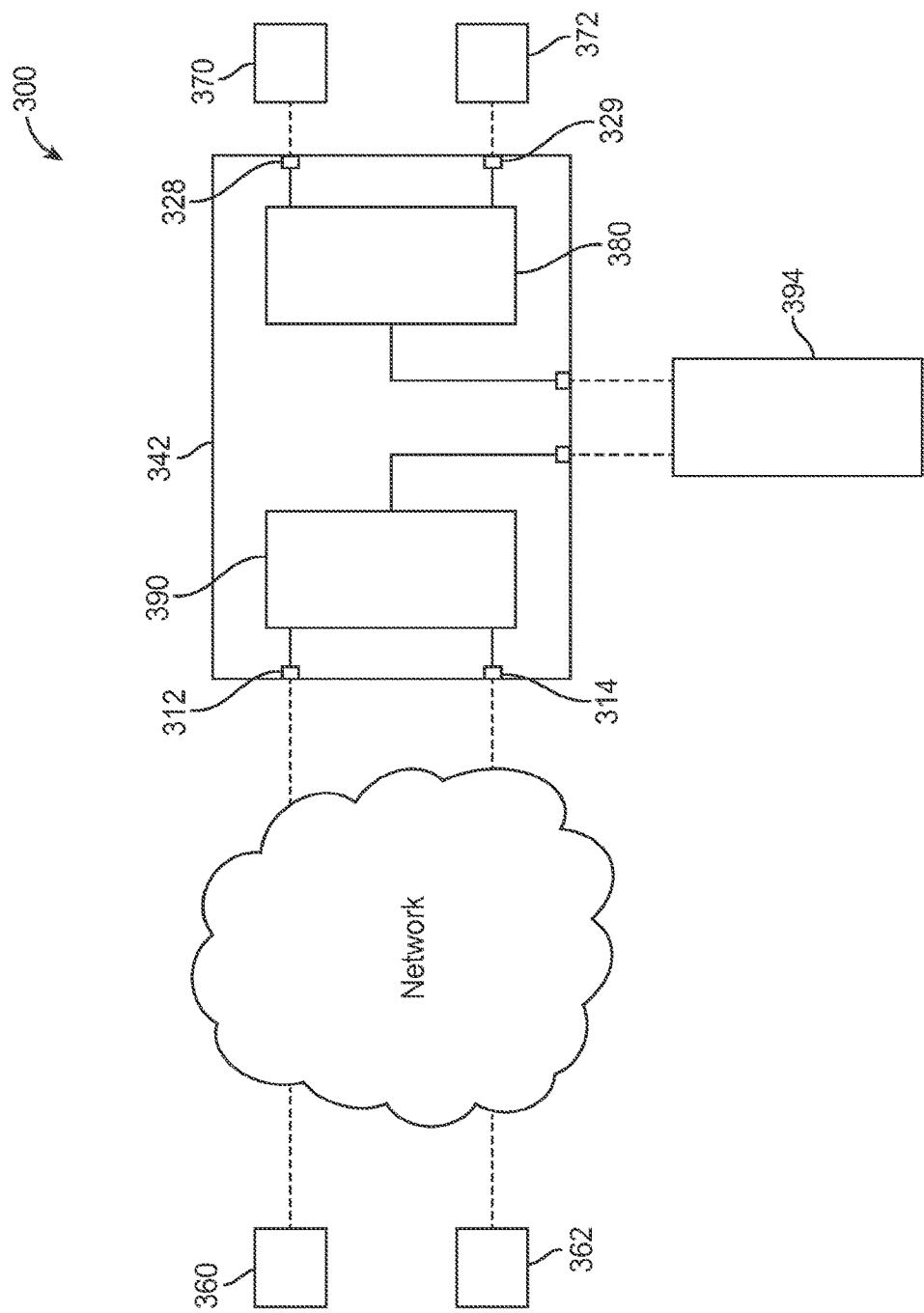
FIG. 4B illustrates a variation of the packet switch apparatus of FIG. 1.

In another example, as shown in FIG. 4B, the tagging module 394 is external to the network switch appliance 300 and is in communication with the network switch appliance 300. In such cases, the network switch appliance 300 and the tagging module 394 collectively form a network switch apparatus.

Figure 4C:
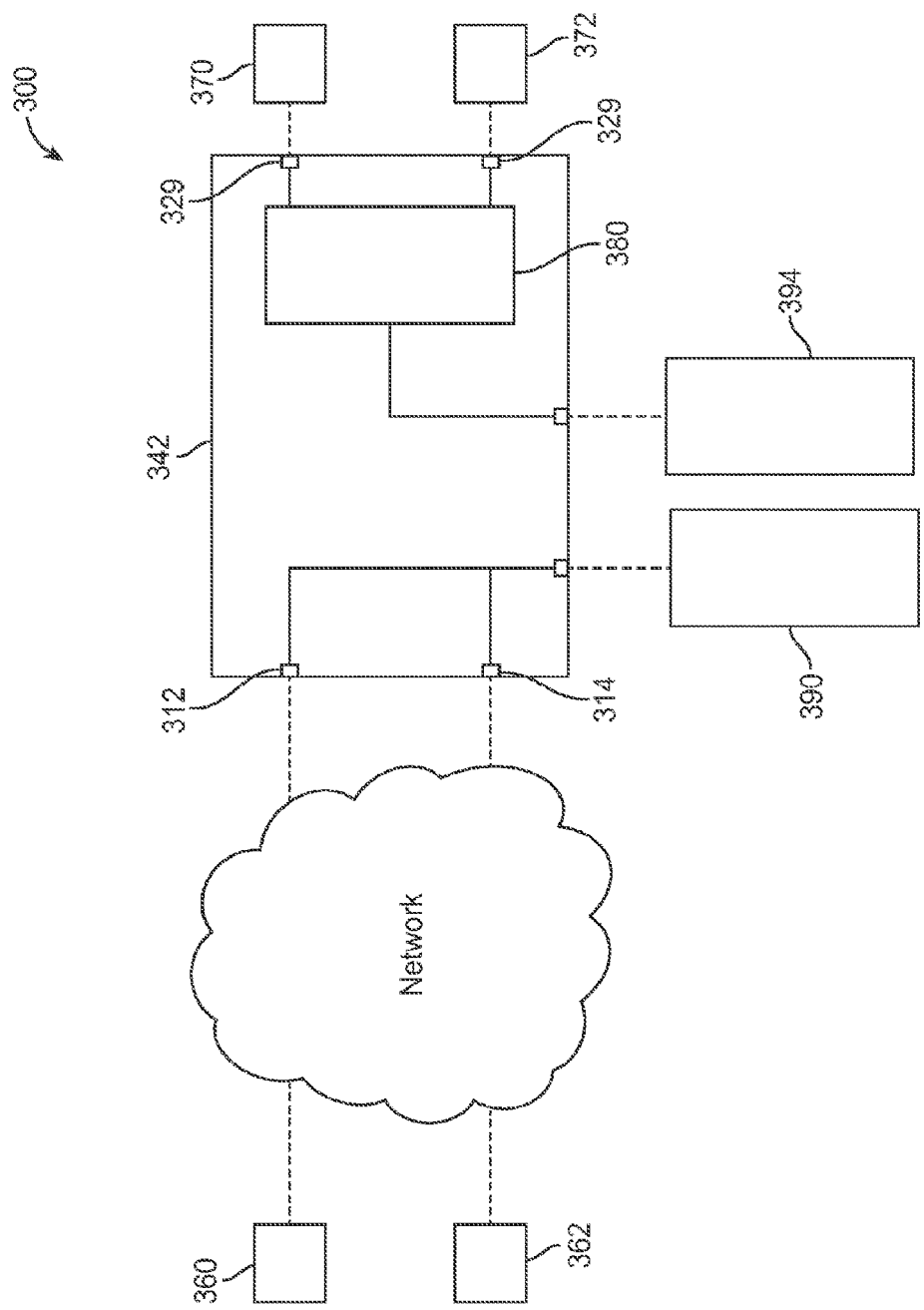
FIG. 4C illustrates a variation of the packet switch apparatus of FIG. 1.

In further embodiments, as shown in FIG. 4C, both the packet duplication module 390 and the tagging module 394 may be external to the network switch appliance 300, and are in communication with the network switch appliance 300. In such cases, the network switch appliance 300, the packet duplication module 390, and the tagging module 394 collectively form a network switch apparatus.

As discussed, in some embodiments, the identifier added by the tagging module 394 may be removed from the tagged packet using a tag stripping module before being forwarded to one or more instrument port(s). In some embodiments, the tag stripping module may be internal to the network switch appliance 300. In other embodiments, the tag stripping module may be external to the network switch appliance 300 and is in communication with the network switch appliance 300. In such cases, the network switch appliance 300 and the tag stripping module collectively form a network switch apparatus.

Also, as discussed, in some embodiments, the multiple identical packets may be provided using a multicast mechanism. With IP multicast, if the original incoming packet is VLAN tagged, the copies of the packet provided by the multicast may replace the original VLAN tag with the new VLAN tags. This has the undesired effect of modifying the original packet. In some embodiments, to address this issue, rather than replacing the original VLAN tag when making multicast copies of the packet, an additional outer VLAN tag may be added to each of the identical packets. Thus, each of the identical packets will have the same original VLAN tag, plus an extra added VLAN tag. The identical packets will be identical, except that they will have different respective added VLAN tags. When the copies of the packet are finally forwarded out to the destination instrument port(s), the outer VLAN tags may be stripped thereby leaving the packets with the original VLAN tag value, that is then forwarded to the network monitoring instrument(s).

Also, as discussed, the duplicate packets may be sent to a loop back port for sequentially being input to a processing unit. in some embodiments, when the packets are looped back, they can be sent to a single loop back port or to a pool of loopback ports. Using a pool of loopback ports is beneficial as it increases the available bandwidth for processing the multicast copies of the packets. When using a pool of loopback ports, the ports can be configured as a link aggregated trunk group thereby allowing the copies to be load balanced across the pool of ports. The same aspect may be used when instead of looping back, the multicast copies are sent to another box (e.g., another network switch appliance, or another processing module coupled to the network switch appliance) for matching against the modified match rules (that now include the matching added identifiers —e.g., VLAN tags). The multicast copies may be load balanced across a link aggregated trunk group to increase the bandwidth.

Figure 5:
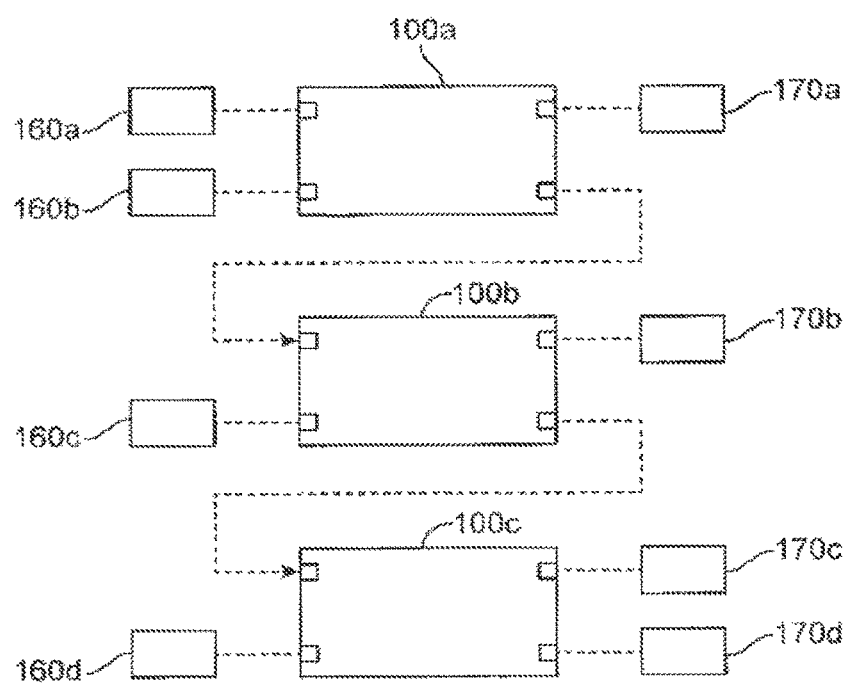
FIG. 5 illustrates a network switch apparatus in a stacked configuration having multiple network switch appliances.

In some embodiments, the method 400 may be performed using a plurality of network switch appliances that are stacked together. FIG. 5 illustrates an example of a stacked configuration in which multiple network switch appliances 100a-100b are stacked together to form a network switch apparatus. Each of the network switch appliances 100a-100b may be implemented using the network switch appliance 300 of FIG. 2. In some embodiments, the stacked network switch appliances 100 may be considered to be a network switch appliance (or device) itself. As shown in FIG. 5, network switch appliance 100a is communicatively coupled to a network monitoring instrument 170a, and nodes 160a, 160b. Network switch appliance 100b is communicatively coupled to a network monitoring instrument 170b, and node 160c. Network switch appliance 100c is communicatively coupled to network monitoring instruments 170c, 170d, and node 160d. In the illustrated embodiments, the network switch appliance 100a is communicating with the network switch appliance 100b through one or more instrument ports. Similarly, the network switch appliance 100b is communicating with the network switch appliance 100c through one or more instrument ports. Thus, the term "instrument port" is not limited to a port for communication with a network monitoring instrument, and may refer to a port for communication between two network switch appliances. In some embodiments, when implementing the method 400 using multiple network switch appliances, an action associated with a matching rule for matching a packet may prescribe that the packet be transmitted from one network switch appliance to another network switch appliance. For example, the first network switch appliance 100a may determine that a tagged duplicate packet matches a rule therein, and the corresponding action may prescribe that the packet be passed to instrument port 40, which has been configured to communicate with network switch appliance 100b. In such cases, the packet is then passed to the second network switch appliance 100b. The tagged identifier of the packet may or may not be removed before passing the packet to the second network switch appliance 100b. After the second network switch appliance 100b receives the packet, the second network switch appliance 100b may then process the packet. For example, the second network switch appliance 100b may determine whether to pass the packet to one or more instrument ports at the second network switch appliance 100b. Optionally, the second network switch appliance 100b may also perform the method 400 to generate multiple duplicate packets that are tagged with different respective identifiers, and process the tagged packets to determine if any of them matches any of the rules in the set that is associated with the second network switch appliance 100b. In other embodiments, a network switch appliance 100 may have multiple instrument ports connected to multiple respective other network switch appliances 100.

Figure 6:
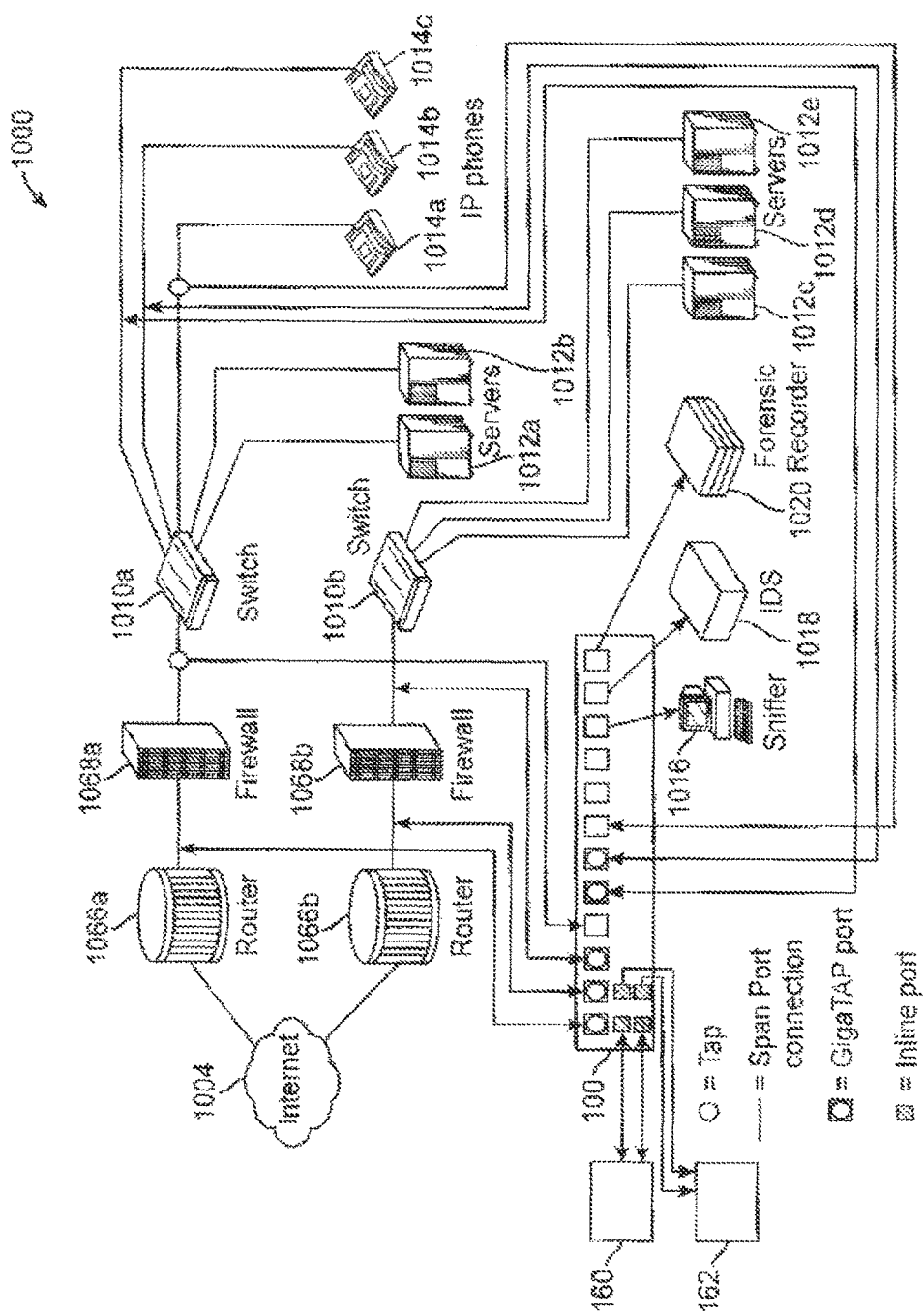
FIG. 6 shows an example of a deployment of the network switch apparatus of FIG. 2 in a network environment in accordance with some embodiments.

FIG. 6 shows the deployment of the network switch appliance 300 in a network environment 1000 in accordance with some embodiments. The Internet 1004 is coupled via routers 1006a-b and firewalls 1068a-b to two switches 1010a and 1010b. Switch 1010a is coupled to servers 1012a-b and IP phones 1014a-c. Switch 1010b is coupled to servers 1012c-e. A sniffer 1016, an IDS 1018 and a forensic recorder 1020 (collectively, "non-pass through instruments") are coupled to the appliance 300. As illustrated in FIG. 6, there is a reduction on the number of non-pass through instruments in this deployment as compared to a conventional configuration (in which there may be one or more non-pass through instruments between router 1066a and firewall 1068a, one or more non-pass through instruments between firewall 1068a and switch 1010a, one or more non-pass through instruments between router 1066b and firewall 1068b, and firewall 1068b and switch 1010b) because the same non-pass through instruments can now access information anywhere in the network environment 1000 through the appliance 300. The user has complete flexibility to channel whatever traffic to whatever instrument or groups of non-pass through instruments, using the any-to-any, any-to-many and many-to-one capability of the system in accordance with the different embodiments described herein. For example, all the conversations of the IP phones 1014a-c can be easily configured to be sent to an IDS 1018. It is also possible that traffic inside a particular IP phone 1014a-c connection can be sent to a sniffer 1016, and Intrusion Detection System 1018 and a forensic recorder 1020 simultaneously via the one-to-many function.

In some embodiments, when using the appliance 300, one or more non-pass through instruments (such as IDS, sniffer, forensic recorder, etc.) may be connected to instrument port(s), and one or more pass through instruments 140a, 140b (e.g., IPS) may be connected to other instrument port(s) (e.g., inline port(s)). Such configuration allows non-pass through instrument(s) and pass through instrument(s) to simultaneously monitor the network traffic. Each non-pass through instrument is in listening mode (i.e., it receives packets intended to be communicated between two nodes), and each pass through instrument is in pass-thru mode (i.e., it receives packets intended to be communicated between two nodes, processes them, and then pass the packets downstream towards the intended recipient node). In some cases, by having both an IDS and an IPS connected to the appliance 300, the appliance 300 can compare whether the IDS or the IPS sees more threats, and/or can have a redundant protection such that if the IPS misses any threat, the IDS may pick it up.

Computer System Architecture

Figure 7:
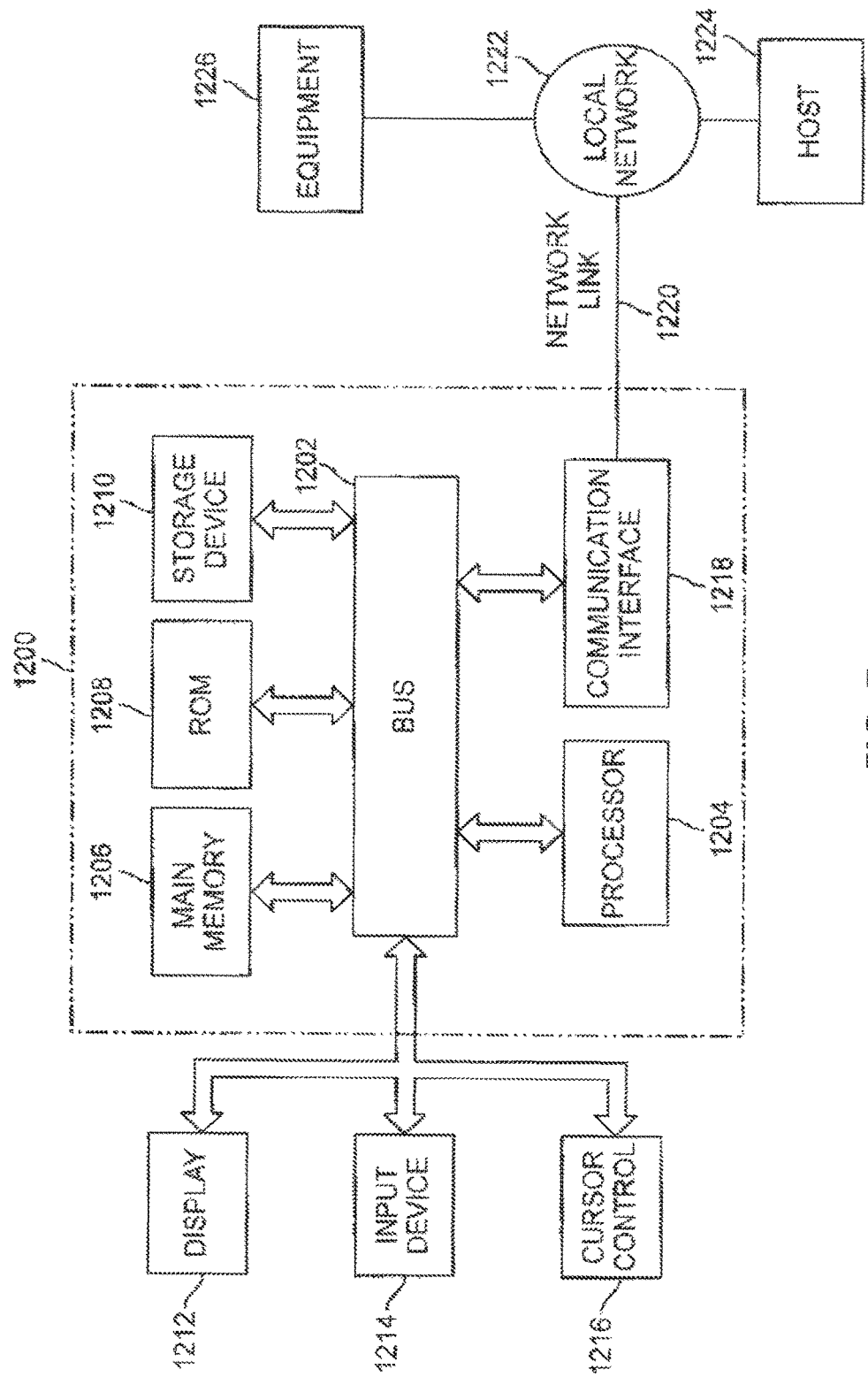
FIG. 7 illustrates an example of a computer system with which embodiments described herein may be implemented.

FIG. 7 is a block diagram that illustrates an embodiment of a computer system 1200 upon which embodiments described herein may be implemented. Computer system 1200 includes a bus 1202 or other communication mechanism for communicating information, and a processor 1204 coupled with the bus 1202 for processing information. The processor 1204 may be used to perform various functions described herein. For example, in some embodiments, the processor 1204 may receive input from a user for configuring a network component (e.g., the component 380).

The computer system 1200 also includes a main memory 1206, such as a random access memory (RAM) or other dynamic storage device, coupled to the bus 1202 for storing information and instructions to be executed by the processor 1204. The main memory 1206 also may be used for storing temporary variables or other intermediate information during execution of instructions to be executed by the processor 1204. The computer system 1200 further includes a read only memory (ROM) 1208 or other static storage device coupled to the bus 1202 for storing static information and instructions for the processor 1204. A data storage device 1210, such as a magnetic disk or optical disk, is provided and coupled to the bus 1202 for storing information and instructions.

The computer system 1200 may be coupled via the bus 1202 to a display 1212, such as a cathode ray tube (CRT), for displaying information to a user. An input device 1214, including alphanumeric and other keys, is coupled to the bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The computer system 1200 may be used for performing various functions in accordance with the embodiments described herein. According to one embodiment, such use is provided by computer system 1200 in response to processor 1204 executing one or more sequences of one or more instructions contained in the main memory 1206. Such instructions may be read into the main memory 1206 from another computer-readable medium, such as storage device 1210. Execution of the sequences of instructions contained in the main memory 1206 causes the processor 1204 to perform the process steps described herein. One or more processors in a multi-processing arrangement may also be employed to execute the sequences of instructions contained in the main memory 1206. In alternative embodiments, hard-wired circuitry may be used in place of or in combination with software instructions to implement features of the embodiments described herein. Thus, embodiments described herein are not limited to any specific combination of hardware circuitry and software.

The term "computer-readable medium" as used herein refers to any medium that participates in providing instructions to the processor 1204 for execution. Such a medium may take many forms, including but not limited to, non-volatile media, volatile media, and transmission media. Non-volatile media includes, for example, optical or magnetic disks, such as the storage device 1210. A non-volatile medium may be considered to be an example of a non-transitory medium. Volatile media includes dynamic memory, such as the main memory 1206. A volatile medium may be considered to be another example of a non-transitory medium. Transmission media includes coaxial cables, copper wire and fiber optics, including the wires that comprise the bus 1202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to the processor 1204 for execution. For example, the instructions may initially be carried on a magnetic disk of a remote computer. The remote computer can load the instructions into its dynamic memory and send the instructions over a telephone line using a modem. A modem local to the computer system 1200 can receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1206, from which the processor 1204 retrieves and executes the instructions. The instructions received by the main memory 1206 may optionally be stored on the storage device 1210 either before or after execution by the processor 1204.

The computer system 1200 also includes a communication interface 1218 coupled to the bus 1202. The communication interface 1218 provides a two-way data communication coupling to a network link 1220 that is connected to a local network 1222. For example, the communication interface 1218 may be an integrated services digital network (ISDN) card or a modem to provide a data communication connection to a corresponding type of telephone line. As another example, the communication interface 1218 may be a local area network (LAN) card to provide a data communication connection to a compatible LAN. Wireless links may also be implemented. In any such implementation, the communication interface 1218 sends and receives electrical, electromagnetic or optical signals that carry data streams representing various types of information.

The network link 1220 typically provides data communication through one or more networks to other devices. For example, the network link 1220 may provide a connection through local network 1222 to a host computer 1224 or to equipment 1226 such as a radiation beam source or a switch operatively coupled to a radiation beam source. The data streams transported over the network link 1220 can comprise electrical, electromagnetic or optical signals. The signals through the various networks and the signals on the network link 1220 and through the communication interface 1218, which carry data to and from the computer system 1200, are exemplary forms of carrier waves transporting the information. The computer system 1200 can send messages and receive data, including program code, through the network(s), the network link 1220, and the communication interface 1218.

It should be noted that when a "packet" is described in this application, it should be understood that it may refer to the original packet that is transmitted from a node, or a copy of it.

Although particular embodiments have been shown and described, it will be understood that they are not intended to limit the claimed inventions, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents, as defined by the claims.

The invention claimed is:

1. A method to efficiently distribute data traffic to a plurality of network monitoring instruments, the method comprising:
   receiving a packet on a network port;
   in response to receiving the packet on the network port, copying the packet to produce a plurality of packets without analyzing the packet by creating a number of packets equal to a number of criteria in a plurality of criteria, wherein each criterion in the plurality of criteria corresponds to exactly one network monitoring instrument in the plurality of network monitoring instruments monitoring the network port;
   in response to copying the packet, tagging each packet in the plurality of packets with a different unique identifier to produce a plurality of unique tagged packets, each of which is unique among the plurality of unique tagged packets, each said unique identifier representing a correspondence between a unique tagged packet and exactly one criterion in the plurality of criteria, each criterion including an action that includes mapping the packet to a port of a network monitoring instrument in the plurality of network monitoring instruments, wherein at least two of the plurality of unique tagged packets have the different unique identifier, and wherein each said unique identifier includes a Virtual Area Network (VLAN) tag;
   for each unique tagged packet in the plurality of unique tagged packets, determining whether the unique tagged packet matches the criterion having the correspondence to the unique tagged packet, without determining whether the unique tagged packet matches a remainder of criteria in the plurality of criteria; and
   in response to determining that the unique tagged packet matches the criterion having the correspondence to the unique tagged packet, performing the action associated with the criterion.

2. The method of claim 1, further comprising:
   sending the unique tagged packet to the network monitoring instrument.

3. The method of claim 1, comprising:
   removing a portion of the packet to produce a compact packet, wherein the removed portion comprises at least one of a header associated with the packet or a body associated with the packet; and
   based on the criterion, copying the compact packet to produce the plurality of packets.

4. The method of claim 1, comprising:
   identifying the network port that received the packet;
   identifying a particular criterion based on identification of the network port that received the packet and an express association between the particular criterion and the network port that received the packet;
   determining a number of copies of the packet to make, based on the particular criterion; and
   copying the packet according to the determined number of copies to provide the plurality of packets.

5. The method of claim 1, wherein the unique identifier comprises a Virtual Local Area Network (VLAN) tag.

6. The method of claim 1, further comprising: when a matched criterion is not found, dropping the packet.

7. The method of claim 1, further comprising storing the criterion in Ternary Content-Addressable Memory (TCAM).

8. The method of claim 1, said tagging each packet in the plurality of packets comprising:
   tagging each packet in the plurality of packets with an ordinal number to obtain the plurality of unique tagged packets; and
   matching each packet in the plurality of packets to the criterion to obtain a matched criterion such that the ordinal number associated with the packet corresponds to an ordinal number associated with the matched criterion.

9. A method to efficiently distribute data traffic to a plurality of network monitoring instruments, the method comprising:
   receiving a packet on a network port;
   in response to receiving the packet on the network port, copying the packet to produce a plurality of packets without analyzing the packet by creating a number of packets in the plurality of packets equal to a number of criteria in a plurality of criteria, wherein each criterion in the plurality of criteria corresponds to exactly one network monitoring instrument in the plurality of network monitoring instruments monitoring the network port;
   in response to copying him the packet, tagging each packet in the plurality of packets with a different unique identifier to produce a plurality of unique tagged packets, each of which is unique among the plurality of unique tagged packets, each said unique identifier representing a correspondence between a unique tagged packet and exactly one criterion in the plurality of criteria, each criterion including an action that includes mapping the packet to a port of a network monitoring instrument in the plurality of network monitoring instruments, wherein at least two of the plurality of unique tagged packets have the different unique identifier, wherein the unique identifier includes a Virtual Area Network (VLAN) tag, and wherein the action comprises forwarding the packet to the network port, forwarding the packet to group of network ports, dropping the packet, assigning the packet to a multicast group, or modifying a field associated with the packet;
   in response to tagging each packet, determining whether the unique tagged packet in the plurality of unique tagged packets matches the criterion having the correspondence to the unique tagged packet, without determining whether the unique tagged packet in the plurality of unique tagged packets matches a remainder of criteria in the plurality of criteria; and
   in response to matching the unique tagged packet, performing the action associated with the criterion.

10. The method of claim 9, said tagging each packet in the plurality of packets comprising:

tagging each packet in the plurality of packets with an ordinal number to obtain the plurality of unique tagged packets;

matching each packet in the plurality of packets to the to obtain a matched criterion such that the ordinal number associated with the packet corresponds to an ordinal number associated with the matched criterion; and performing the action associated with the matched criterion.

11. A system to efficiently distribute data traffic to a plurality of network monitoring instruments, the system comprising:

a network port configured to receive a packet;

packet duplication circuitry to copy the packet to produce a plurality of packets without analyzing the packet by creating a number of packets in the plurality of packets equal to a number of criteria in a plurality of criteria, wherein each criterion in the plurality of criteria corresponds to exactly one network monitoring instrument in the plurality of network monitoring instruments monitoring the network port; and tagging circuitry to tag each packet in the plurality of packets with a different unique identifier to produce a plurality of unique tagged packets, each of which is unique among the plurality of unique tagged packets, each said unique identifier representing a correspondence between a unique tagged packet and exactly one criterion in the plurality of criteria, each criterion including an action that includes mapping the packet to a port of a network monitoring instrument in the plurality of network monitoring instruments, wherein at least two of the plurality of unique tagged packets have the different unique identifier, wherein the unique identifier includes a Virtual Area Network (VLAN) tag;

a processing unit to determine whether the unique tagged packet in the plurality of unique tagged packets matches the criterion having the correspondence to the unique tagged packet, without determining whether the unique tagged packet in the plurality of unique tagged packet matches a remainder of criteria in the plurality of criteria, and to perform the action associated with the criterion in response to matching the unique tagged packet.

12. The system of claim 11, further comprising the processing unit configured to:

send the unique tagged packet to the network monitoring instrument.

13. The system of claim 11, wherein the unique identifier associates one packet in the plurality of unique tagged packets with one network monitoring instrument in the plurality of network monitoring instruments.

14. The system of claim 11, the packet duplication circuitry to:

identify the network port that received the packet;

identify a particular criterion, based on identification of the network port that received the packet and an express association between the particular criterion and the network port that received the packet;

determine a number of copies of the packet to make, based on the particular criterion; and copy the packet according to the determined number of copies to provide the plurality of packets.

15. The system of claim 11, wherein the packet duplication circuitry comprises a multicast mechanism.

16. The system of claim 11, further comprising an input mechanism comprising one or more loop back ports, the input mechanism configured to input the plurality of unique tagged packets sequentially into the processing unit.

17. The system of claim 11, the tagging circuitry to:

tag each packet in the plurality of packets with an ordinal number to obtain the plurality of unique tagged packets; and match each packet in the plurality of packets to the to obtain a matched criterion such that the ordinal number associated with the packet corresponds to an ordinal number associated with the matched criterion.

18. The system of claim 17, further comprising the processing unit configured to remove the ordinal number from each packet in the plurality of unique tagged packets.

* * * * *